United States Patent [19]

Flanagan et al.

[11] Patent Number: 5,159,595
[45] Date of Patent: Oct. 27, 1992

[54] RING TRANSMISSION SYSTEM

[75] Inventors: Thomas P. J. Flanagan, Nepean; James A. McEachern, Kanata; David J. Nicholson, Ottawa; Dino Diperna, Lachine; Richard Romagnino, Montreal, all of Canada; Wayne Ergle, Norcross, Ga.

[73] Assignee: Northern Telecom Limited, Montreal, Canada

[21] Appl. No.: 286,713

[22] Filed: Dec. 20, 1988

Related U.S. Application Data

[63] Continuation-in-part of Ser. No. 179,462, Apr. 8, 1988, abandoned.

[51] Int. Cl.$^5$ .............................. H04J 3/02
[52] U.S. Cl. .................. 370/85.15; 370/16; 340/827; 371/8.1
[58] Field of Search ............. 370/16, 88, 85.15, 85.14, 370/85.12, 85.5, 85.1, 15, 16.1; 340/827, 825.01, 825.05; 371/8, 8.1, 11.1, 11.2, 20.6, 20.5

[56] References Cited

U.S. PATENT DOCUMENTS

| | | | |
|---|---|---|---|
| 4,370,744 | 1/1983 | Hirano et al. | 370/88 |
| 4,575,843 | 3/1986 | David et al. | 370/88 |
| 4,633,246 | 12/1986 | Jones et al. | 370/16 |
| 4,704,714 | 11/1987 | Tomizawa | 370/16 |
| 4,747,097 | 5/1988 | Ohya | 370/16 |
| 4,769,807 | 9/1988 | Niwa | 370/16 |
| 4,815,069 | 3/1989 | Nakayashiki | 370/16 |

FOREIGN PATENT DOCUMENTS 2917675  11/1980  Fed. Rep. of Germany ........ 370/88

Primary Examiner—Douglas W. Olms
Assistant Examiner—Dang T. Ton
Attorney, Agent, or Firm—Foley & Lardner

[57] ABSTRACT

A transmission system comprises nodes coupled in a ring via two multiplexed transmission paths having opposite transmission directions. The two paths can be time, space, or wavelength division multiplexed. Bidirectional communications between any two nodes are provided in normal operation using both paths around a first, most direct, part of the ring. In the event of a fault affecting such communications, a protection switch is made to maintain bidirectional communications between the two nodes using both paths around a second, remaining, part of the ring. In this manner, each path can simultaneously carry both normal and protection switched signals. In an embodiment of the invention, only the two nodes adjacent a fault need be aware of the fault, each of these nodes effecting a protection switch for signals terminated at the node and effecting a protective loopback for other signals needing protection. The invention enhances the total capacity of the paths for carrying normal and protection switched signals. A network may comprise a plurality of such ring transmission systems intersecting at at least one network node, the network node comprising a node of each ring and a cross connect switch for switching signals therebetween.

11 Claims, 8 Drawing Sheets

RING TRANSMISSION SYSTEM

This application is a continuation-in-part of U.S. patent application Ser. No. 179,462 filed Apr. 8, 1988 in the names of T. P. J. Flanagan, J. A. McEachern and D. J. Nicholson entitled "Ring Transmission System", now abandoned.

This invention relates to a transmission system comprising nodes, for example telephone central offices, coupled in a ring via two oppositely directed multiplexed transmission paths.

Time division multiplexed double ring transmission systems are generally known and described in various references. For example, Smith et al. U.S. Pat. No. 3,859,468 issued Jan. 7, 1975 and entitled "Redundant Data Transmission Arrangement" describes an arrangement in which transmission terminals are serially connected to a base terminal by primary and secondary looped lines over which tdm (time division multiplexed) data signals are transmitted in opposite directions. Seo U.S. Pat. No. 4,446,551 issued May 1, 1984 and entitled "Data Highway System with Dual Transmitting Loop Lines", describe similar types of transmission system in which a master station and remote or slave stations are coupled in a ring via oppositely directed transmission paths. Jones et al. U.S. Pat. No. 4,633,246 issued Dec. 30, 1986 and entitled "Time Division Multiplex Ring" describes a ring transmission system with oppositely directed transmission paths coupling nodes which are all equivalent to one another; i.e. there is no master station.

In such known systems, one of the transmission paths is a main or primary transmission path which is used in normal operation, each node receiving signals from and transmitting signals to this path in a single direction around the ring. The other transmission path is a standby or secondary path which is used to protect transmitted signals in the event of various fault conditions occurring.

For example, in the Jones et al. patent, in normal operation each node transmits signals to and receives signals form the main path which has a clockwise transmission direction around the ring. The same signals are transmitted to, but are not received from, the standby path which has a counter-clockwise transmission direction. In the event of a fault occurring, the nodes may receive signals from the standby path instead of from the main path, may bridge the standby path through the node, or may loop back signals from the main path to the standby path, to maintain communications among the nodes. IN a fault condition, the two loops are reconfigured to form a single folded loop. Various fault conditions, and the resulting reconfiguration, are described in the Jones et al. patent.

It is also known for example from Reid et al. U.S. Pat. No. 4,646,286 issued Feb. 24, 1987 and entitled "Communications System with Protection Switching and CHannel Identities" to provide an optical fiber communications system in which optical fiber working and protection channels extend in both directions between first and second terminals, optionally via intermediate drop-and-insert terminals. Such a system is an end-to-end, or linear, transmission system, in which the nodes are not coupled in a ring as in the other references discussed above.

An object of this invention is to provide an improved ring transmission system, and an improved method of transmitting signals in such a system.

An aspect of the invention provides a method of transmitting signals in a transmission system comprising at least four nodes coupled in a ring via first and second multiplexed transmission paths providing for transmission in opposite directions around the ring, comprising the steps of: in normal operation, transmitting signals from a first node to a second node via the first transmission path and a third node between the first and second nodes, and transmitting signals from the second node to the first node via the second transmission path and the third node; and in the presence of a fault between the second and third nodes, transmitting signals from the first node to the second node via the first transmission path between the first and third nodes, via the third node between the first and second transmission paths, and via the second transmission path and at least a fourth node between the third and second nodes, and transmitting signals from the second node to the first node via the first transmission path and the at least fourth node between the second and third nodes, via the third node between the first and second transmission paths, and via the second transmission path between the third and first nodes.

The invention will be further understood from the following description with reference to the accompanying drawings, in which.

Figure 6:
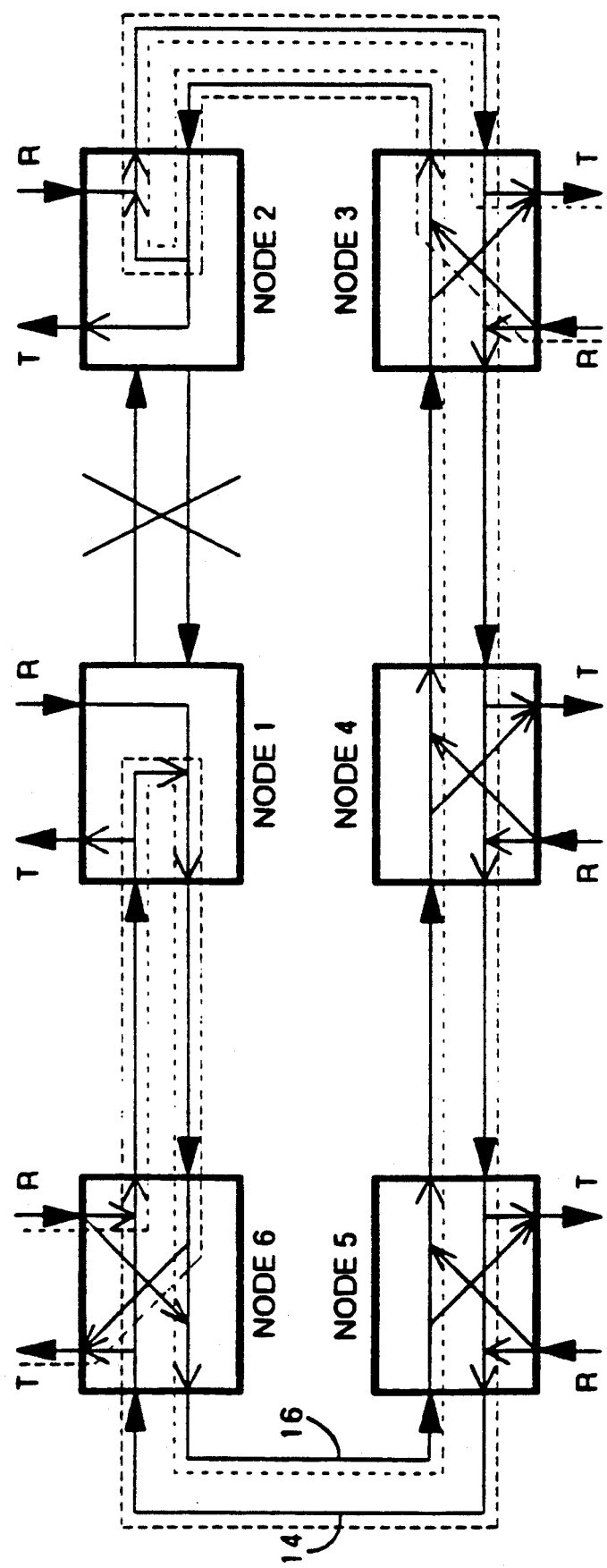
FIG. 6 illustrates a transmission system in accordance with another embodiment of this invention in a fault condition.

Although for clarity and simplicity FIGS. 1 to 4 and 8 to 10 each show a transmission system with four nodes, and FIG. 6 shows a system with six nodes, in each case the transmission system can have an arbitrary number of nodes.

Figure 1:
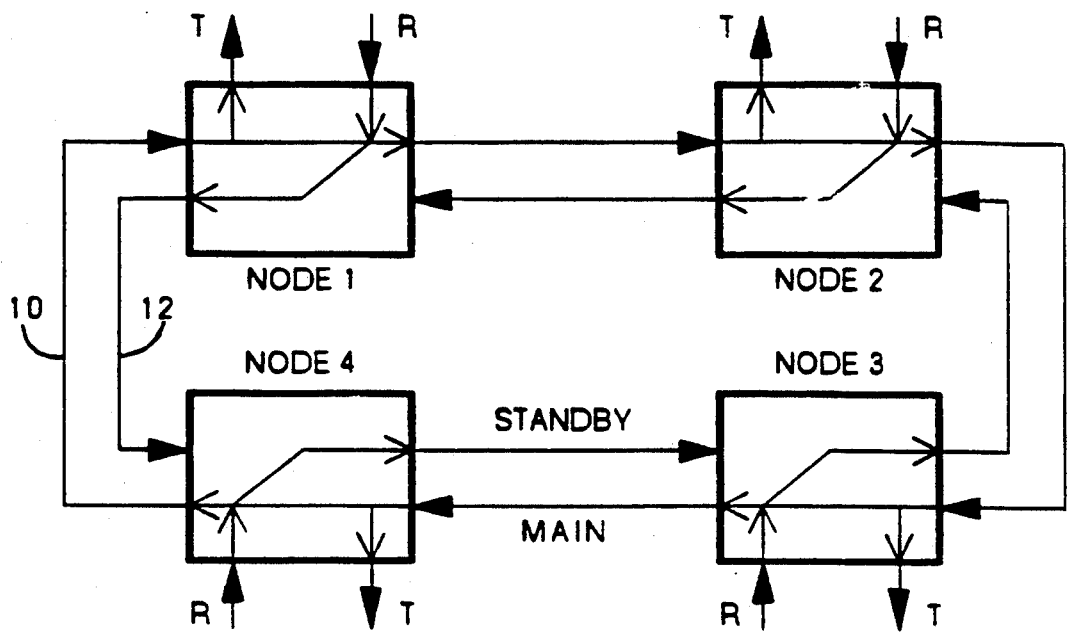
FIGS. 1 and 2 illustrate a known ring transmission system in normal and fault conditions respectively.
Figure 2:
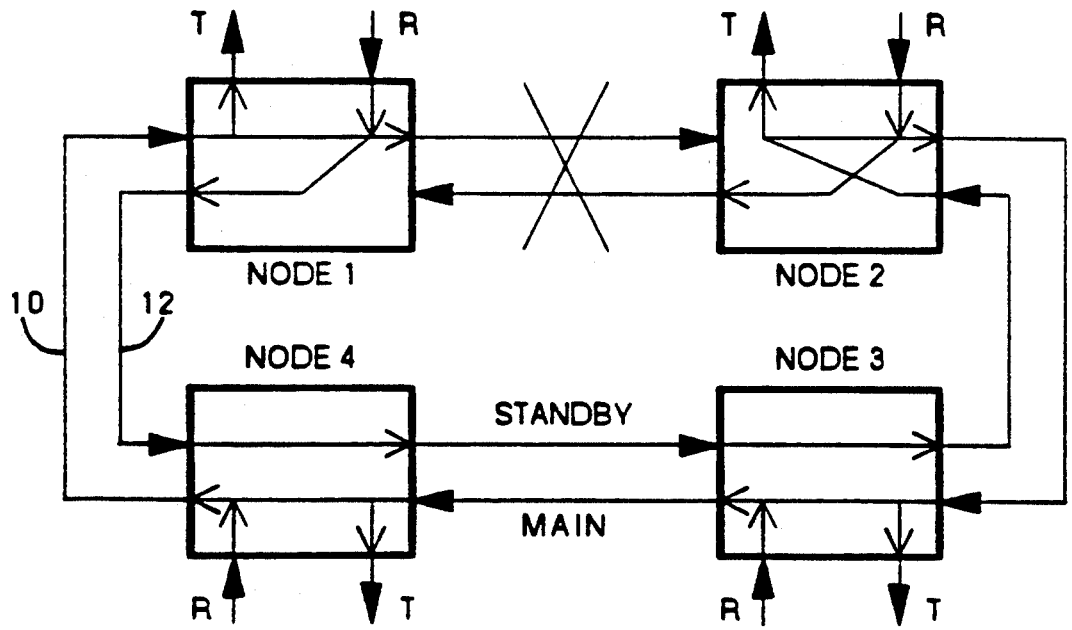

Referring to FIGS. 1 and 2, a known time division multiplexed (tdm) ring transmission system is illustrated with four nodes coupled in series via main and standby tdm transmission paths 10 and 12 respectively. Each of the paths 10 and 12 is in the form of a ring or loop for carrying a signal in a respective direction around the loop, clockwise for the main path 10 and counter-clockwise for the standby path 12. Each node includes a transmit port T and a receive port R, at which arbitrary channels of the signals carried around the loop can be dropped or added respectively.

FIG. 1 illustrates the system in normal, fault-free, operation. In each node signal channels incoming on the main path 10 are either dropped at the transmit port T, and replaced by signal channels added at the receive port R, or are passed through to the outgoing port on the main path 10. The signal outgoing on the main path 10 is also supplied to the outgoing port on the standby path 12, but there is no connection for signal channels incoming on the standby path 12.

Thus for example for a signal channel connection between the nodes 1 and 2, the signal incoming at the receive port R of node 1 is coupled via the main path 10 to the transmit port T of node 2, and the signal incoming at the receive port R of node 2 is coupled via the main path 10, passing through the nodes 3 and 4 in turn, to the transmit port T of node 1.

FIG. 2 illustrates the known system in a fault condition in which both of the main and standby paths 10 and 12 are interrupted (e.g. due to a cable cut) between the nodes 1 and 2. In this situation, within the node which on the main path 10 is downstream from the interruption, i.e. within node 2 in this case, there is no connection for any signal incoming on the main path 10, and instead the signal incoming on the standby path 12 is connected and is looped back to the outgoing port on the main path 10. Within each node which is not adjacent to the interruption, i.e. within each of nodes 3 and 4 in this case, the standby path 12 is bridged through the node. In other words, the outgoing port on the standby path is connected to the incoming port on the standby path instead of to the outgoing port on the main path.

The reconfigured system in FIG. 2 provides a single folded loop for communication among all the nodes. For example, for a signal channel connection between the nodes 1 and 2, the signal incoming at the receive port R of node 1 is coupled via the standby path 12 and the bridged through connections in the nodes 4 and 3 in turn to the transmit port T of node 2, and the signal incoming at the receive port R of node 2 is coupled via the main path 10 and the nodes 3 and 4 in turn to the transmit port T of node 1. Similarly, for a signal channel connection between the nodes 3 and 4, a signal at node 3 port R is coupled via the main path 10 to node 4 port T, and a signal at node 4 port R is coupled via the main path 10 to node 1, then via the standby path 12 and nodes 4 and 3 in turn to node 2, then via the loop-back connection to the main path 10 and thence to node 3 port T.

From the above description, it can be seen that in the system of FIGS. 1 and 2 all bidirectional traffic between any two nodes is carried once around a loop, this being constituted by the main path 10 in the normal situation in FIG. 1 and being constituted by the folded loop formed by both paths 10 and 12 in the fault condition of FIG. 2. Thus each of the paths 10 and 12 must have the capacity between any two nodes to carry the total of all signal channels in the loop.

By way of example, suppose that there is only point-to-point traffic between adjacent nodes (no point-to-point traffic between non-adjacent nodes) of 11 signal channels between nodes 1 and 2, 5 signal channels between nodes 2 and 3, 24 signal channels between nodes 3 and 4, and 8 signal channels between nodes 4 and 1. Then each of the main and standby paths 10 and 12 must be capable of carrying the sum (11+5+24 +8) of 48 signal channels. It should be appreciated that the numbers of signal channels carried between nodes of the system can differ in this manner around the loop because traffic is dropped and added at each node. This dropped and added traffic may include circulating in other, adjacent and overlapping, loops of a more complex network of which the system of FIGS. 1 and 2 may form a part, as is explained further below with reference to FIG. 12.

Figure 3:
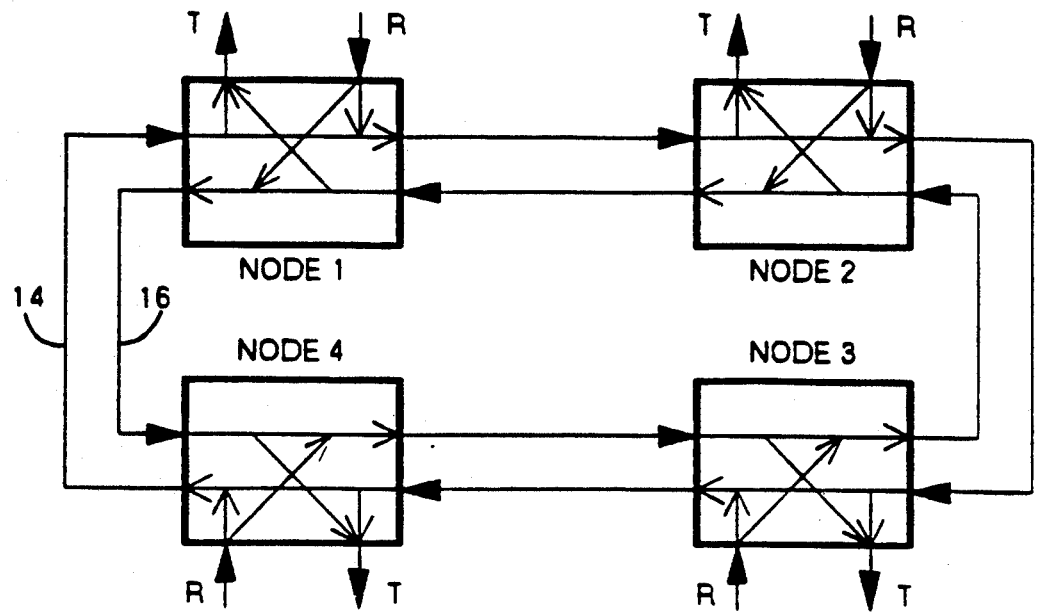
FIGS. 3 and 4 illustrate a ring transmission system in accordance with an embodiment of this invention in normal and fault conditions respectively.
Figure 4:
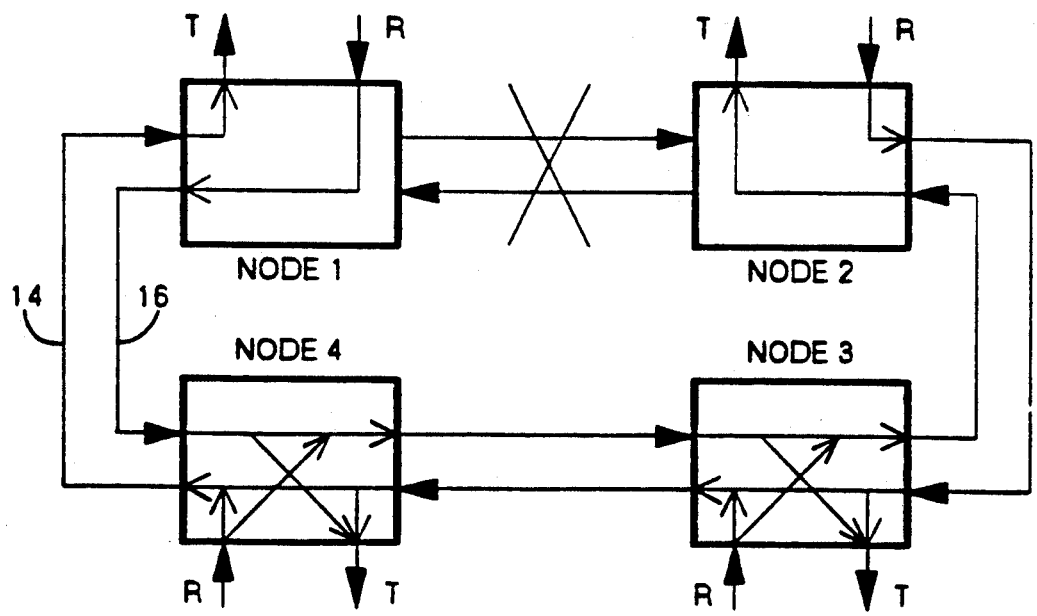

FIGS. 3 and 4 illustrate a ring transmission system in accordance with an embodiment of the invention, using where appropriate similar terminology to that used above with reference to FIGS. 1 and 2. FIG. 3 illustrates normal, fault-free, operation, and FIG. 4 illustrates operation in a fault condition similar to that of FIG. 2. In the system of FIGS. 3 and 4 there are four nodes and two tdm paths, for clockwise and counter-clockwise signal transmission, as in the system of FIGS. 1 and 2, but as described further below the paths do not constitute a main and a standby path as in the prior art, and are accordingly referred to as a first path 14 for clockwise transmission and a second path 16 for counter-clockwise transmission.

Referring to FIG. 3, showing normal, fault free, operation, in each node signal channels incoming on the first path 14 are selectively coupled to the node's transmit port T or passed through to the outgoing port on this path 14, signal channels incoming on the second path 16 are selectively coupled to the node's transmit port T or passed through to the outgoing port on this path 16, and signal channels incoming at the node's receive port R are selectively supplied to either the outgoing port on the path 14 or the outgoing port on the path 16.

In this case, for a signal channel connection between the nodes 1 and 2, the signal incoming at the receive port R of node 1 is coupled via the first path 14 to the transmit port T of node 2, and the signal incoming at the receive port R of node 2 is coupled via the second path 16 to the transmit port T of node 1. Thus for such a signal channel connection between adjacent nodes, signals are coupled via both of the paths 14 and 16 directly between the nodes in the manner of bidirectional point-to-point communications, and the remainder of the loops on the paths 14 and 16 do not carry these signals. More generally, in the system of FIG. 3 signals between any two nodes are coupled via the most direct route around the loop on both paths for the two directions of transmission, the node coupling the signals between its ports to this end. This can be seen to be quite different from the system of FIG. 1, in which only one of the paths is effective in normal, fault-free, operation.

FIG. 4 illustrates the same system as FIG. 3 but in a fault condition which is the same as that in FIG. 2, i.e. an interruption of both paths 14 and 16 between the nodes 1 and 2. In FIG. 4, the nodes 1 and 2 do not couple signals to, or receive signals from, the faulty parts of the paths. Thus now the node 1 couples its receive port R only to the outgoing port on the path 16 and couples its transmit port T only to the incoming port on the path 14 and conversely the node 2 couples its receive port R only to the outgoing port on the path 14 and couples its transmit port T only to the incoming port on the path 16. Neither of the nodes 1 and 2 provides pass-through coupling on the paths 14 and 16. The connection paths between the ports of the nodes 3 and 4 not on either side of the fault are unchanged from those shown in FIG. 3 (although the signal channel couplings between the ports of these nodes may be changed as described further below).

The reconfigured system in FIG. 4 also maintains bidirectional communications among all of the nodes. For example, for a signal channel connection between the nodes 1 and 2, the signal incoming at the receive port R of node 1 is coupled via the path 16 and the pass-through connections in the nodes 4 and 3 in turn to the transmit port T of node 2, and the signal incoming at the receive port R of node 2 is coupled via the path 14 and the pass-through connections in the nodes 3 and 4 in turn to the transmit port of node 1. Thus bidirectional point-to-point communications between the nodes 1 and 2 are maintained, but now the coupling of signals is via the less direction, still intact, part of the loop on each path.

In the system of FIGS. 3 and 4, a signal channel connection between, for example, the nodes 3 and 4 is unaffected by the fault between the nodes 1 and 2; in both the normal and the fault condition, signals are coupled from node 3 port R via the path 14 to node 4 port T, and from node 4 port R via the path 16 to node 3 port T. Similarly, connections between the adjacent nodes 1 and 4, and between the adjacent nodes 2 and 3, and connections between the nodes 1 and 3 via the node 4, and between the nodes 2 and 4 via the node 3, are unaffected by the fault between the nodes 1 and 2.

In the system of FIGS. 3 and 4, a signal channel connection between the nodes 1 and 3 via the node 2 is affected by the fault between the nodes 1 and 2. In this case, the signal incoming at node 3 port R, and previously coupled via the path 16 and node 2 to node 1 port T, must in FIG. 4 instead be coupled via the path 14 and node 4. Conversely, the signal supplied to node 3 port T, originating at node 1 port R and previously derived via node 2 and the path 14, must in FIG. 4 be derived via node 4 and the path 16. Accordingly, the node 3 remote from the fault must nevertheless be informed (through signalling between the nodes on overhead information) of the fault so that it can effect appropriate switching of signal channel connections which are affected by the fault and are terminated (i.e. are supplied to and from the ports T and R respectively) at this node. Similar comments applying respect of the node 4.

Using the same numbers as before, suppose that there is only point-to-point traffic between adjacent nodes (no point-to-point traffic between non-adjacent nodes) of 11, 5, 24, and 8 signal channels between nodes 1 and 2, 2 and 3, 3 and 4, and 4 and 1 respectively. Then in the fault condition of FIG. 4, the paths 14 and 16 must be able to carry $5+11=16$ signal channels (i.e. the original 5 channels between nodes 2 and 3 plus the redirected 11 channels form between nodes 1 and 2) between nodes 2 and 3, $24+=33$ signal channels between nodes 3 and 4, and $8+11=19$ signal channels between nodes 4 and 1. In general, in this simple case of only adjacent node traffic, for protection against interruption of both paths 14 and 15 anywhere around the loop, the two paths 14 and 15 between any two adjacent nodes must be capable of carrying the normal point-to-point traffic between these two nodes plus, for protection, the greatest level of point-to-point traffic between any other two adjacent nodes around the loop. This is obviously no greater than, and is normally less than, the sum of all traffic anywhere in the loop as in the prior art system of FIGS. 1 and 2.

Thus in the system of FIGS. 3 and 4 the capacity required of the paths 14 and 16 for carrying traffic in both normal and fault conditions is generally less than that required of the paths 10 and 12 in the prior art system of FIGS. 1 and 2. This saving in capacity means that the paths 14 and 16 can have a lower capacity than the paths 10 and 12 for the same traffic conditions, and/or the paths 14 and 16 can have the same capacity as the paths 10 and 12 while providing a greater traffic capacity between the nodes.

As should be appreciated from the above description, the capacity saving arises from the switching within the nodes of traffic to both paths 14 and 16, whereby both paths are used for bidirectional traffic between any two nodes via the most direct path available. In consequence, each individual path 14 or 16 carries both its normal traffic and protected (i.e. redirected) traffic in the fault condition of FIG. 4, and in the normal condition carries its normal traffic and has spare capacity for protected traffic in the vent of a fault.

Viewed alternatively, it can be seen that on each path 14 or 16 the normal traffic and the protected traffic (in the fault condition of FIG. 4) or space capacity therefor (in the normal condition of FIG. 3) are time division multiplexed together. Other forms of multiplexing, such as space division multiplexing and wavelength division multiplexing as described below, may be used in a similar manner.

In a normal system traffic will be present not only between adjacent nodes (e.g. nodes 1 and 2) as discussed above, but also between non-adjacent nodes (e.g. nodes 1 and 3). The system of FIGS. 3 and 4 does not provide a capacity saving, compared with the system of FIGS. 1 and 2, for traffic between non-adjacent nodes, because such traffic travels half way around the loop in each case, but there will still be the saving as discussed above for the traffic between adjacent nodes. In general, for loops with arbitrary numbers of nodes, the invention provides a capacity saving except in respect of traffic which travels half way around the loop. This capacity saving is discussed further below with reference to FIG. 11.

Figure 5:
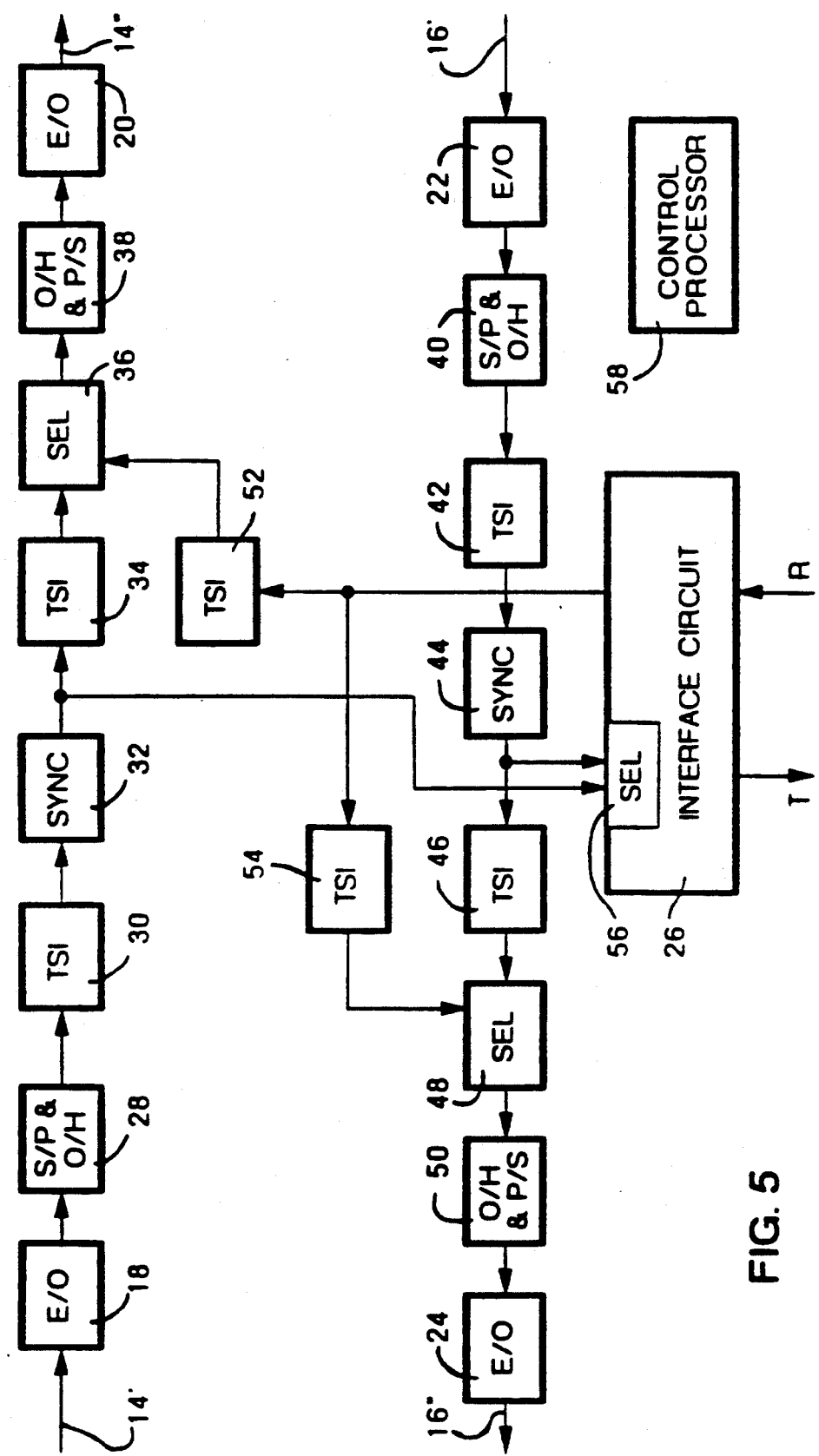
FIG. 5 illustrates a node of the system of FIGS. 3 and 4.

FIG. 5 illustrates a node of the system of FIGS. 3 and 4 for use in a synchronous optical network operating in accordance with the proposed SONET standard, referred to below simply as SONET. Before describing FIG. 5, it is appropriate to describe SONET briefly.

In SONET, a basic format is provided for a tdm signal at a bit rate of 51.84 Mb/s. Such a signal in electrical form is referred to as an STS-1 signal, STS being an abbreviation for Synchronous Transport Signal. A plurality of n such signals may be byte interleaved to form higher level synchronous signals, referred to as STS-n signals. THus an STS-3 signal (n=3) has a bit rate of $3 \times 51.84 = 155.52$ Mb/s, and an STS-12 signal (n=12) has a bit rate of $12 \times 41.84 = 622.08$ Mb/s. A conventional DS-3 signal at a bit rate of 44.736 Mb/s, or 28 conventional DS-1 signals, each within a so-called virtual tributary at a bit rate of 1.728 Mb/s, can be mapped into an STS-1 signal to be carried via a SONET network. Similarly, higher level existing signals at bit rates of the order of 140 Mb/s and 570 Mb/s can be mapped into STS-3 and STS-12 signals respectively.

An optical carrier signal, which is generated by converting an STS-n signal into an optical signal to be transmitted via an optical fiber path, is referred to as an OC-n signal. OC-12 signals at a modulated bit rate of 622.08 Mb/s, and OC-48 signals at a modulated bit rate of 2.48832 Gb/s, are of particular significance in SONET.

The synchronous nature of the STS-n signals makes it relatively simple to access, for example, individual STS-1 signals within an STS-12 signal, whereby overhead information in each STS-1 signal can be readily separated for monitoring, control, and signalling purposes. This overhead information includes automatic protection switching (APS) bytes, designated K1 and K2, for each STS-1 signal, which are used for communication from the tail end to the head end of a connection to effect protection switching for the STS-1 signal.

As the SONET format is byte interleaved, with 8-bit bytes, within each node the signals are conveniently handled in 8-bit parallel form. Thus an STS-12 signal has a bit rate of 622.08/8=77.76 Mb/s on each of eight parallel lines.

Referring now to FIG. 5, the incoming and outgoing ports of the path 14 are referenced 14' and 14" respectively, and the incoming and outgoing ports of the path 16 are referenced 16' and 16" respectively. Each of these ports is coupled to a respective one of four electro-optical interfaces (E/O) 18, 20, 22, and 24 respectively. The node's transmit port T and receive port R are coupled to an interface circuit 26.

Between the output of the E/O 18 and the input of the E/O 20 are connected in series a serial-to-parallel converter and overhead demultiplexer circuit (S/P & O/H) 28, a time slot interchanger (TSI) 30, and STS synchronizing circuit (SYNC) 32, another TSI 34, a selector (SEL) 35, and an overhead multiplexer circuit and parallel-to-serial converter (O/H &P/S) 38. Similarly, the output of the E/O 22 is connected via an S/P & O/H 40, a TSI 42, a SYNC 44, a TSI 46, an SEL 48, and an O/H & P/S 50 to the input of the E/O 24. The node's receive port R is coupled via the interface circuit 26 and two further TSIs 52 and 54 to second inputs of the selectors 36 and 48 respectively, and outputs of the SYNCs 32 and 44 are connected via a selector (SEL) 56 within the interface circuit 26 and thence to the node's transmit port T. In addition to the selector 56, the interface circuit 26 provides the necessary interfacing (including multiplexing, demultiplexing, synchronization, etc. between the STS signals, supplied by the SYNCs 32 and 44 and supplied in the TSIs 52 and 54, and the signals at the ports T and R, whether these are in an STS form as assumed herein or another (e.g. DS-3) form.

The node further includes a control processor block 58 which is connected (via lines not shown) to all of the elements 26 to 56 for deriving information therefrom and for the control thereof. Functions of this block 58, which includes connection and selection memories for the TSIs and selectors and also serves for maintenance purposes, will become apparent from the following description. In addition, within the node various of the elements shown in FIG. 5 and the connections therebetween may be duplicated in known manner for redundancy and reliability, but for clarity and simplicity the duplicated equipment is not described further here.

It is assumed here that each of the paths 14 and 16 carries an OC-48 optical signal, so that such a signal is present at each of the incoming ports 14' and 16'. These signals for the two directions of transmission through the node are processed similarly, and accordingly the following description relates only to signals derived from the port 14'.

The OC-48 signal at the port 14' is converted into an STS-48 electrical signal at a bit rate of 2.48832 Gb/s by the E/O 18. In the S/P & O/H 28 this STS-48 signal is converted into byte (8-bit) parallel form (311.04 Mb/s on each of 8 lines) and is reframed, parity-checked, and descrambled, and overhead information is extracted and supplied to the control processor block 58. The S/P & O/H 28 may further effect a four-way sequential byte disinterleaving of the STS-48 signal, thereby producing four parallel STS-12 signals at its output, each in byte parallel form. This byte disinterleaving lowers the bit rate on individual lines by a further factor of four, to 77.76Mb/s, to facilitate signal processing, and is complemented by sequential byte interleaving at appropriate points elsewhere in the node, for example in the O/H & P/S 38. However, for simplicity this is not futher discussed here.

The TSI 30 can assign each of the 48 STS-1 signals incoming to it to any of 48 STS-1 signals incoming to it to any of 48 STS-1 signals outgoing from it, the assignments being stored in a connection memory in the control processor block 58. The same comment applies to each of the other TSIs 34, 42, 46, 52, and 54. The synchronous nature of the STS signals facilitates this assignment or time switching, so that this is readily achieved using conventional time and/or space switching techniques. For example, conceptually for each TSI the 48 incoming STS-1 signals could be separated onto 48 separate paths, and a 1-from-48 selector could be provided for each of 48 separate output paths to couple each output path to any input path, the 48 output paths then being multiplexed as desired.

The SYNC 32 performs STS signal alignment by performing STS pointer processing ao align each of the 48 STS-1 signals to the system frame. The synchronized STS signals are subject to rearrangement in the TSI 34. The selector 36 selects STS-1 signals from either this TSI 34 or the TSI 52, which interchanges STS-1 signals derived from the node's receive port R, in dependence upon information stored in memory in the control processor block 58, and supplies a resulting STS-48 signal to the O/H & P/S 38. In the unit 38 overhead information from the control processor block 58 is multiplexed in the SONET format, parity checking information is added, and the byte-parallel STS-48 signal is scrambled and converted into a bit-serial form for transmission via the E/O 20 and the outgoing port 14".

As indicated above, signals passing in the opposite direction, from the port 16' and the receive port R towards the port 16", are processed in a similar manner. In addition, STS-1 signals intended to be dropped at the node's transmit port T are selected by the selector 56, alos controlled by the control process block 58, from the outputs of the SYNCs 32 and 44.

In the node of FIG. 5, STS-1 siganls incoming at the node's receive port R are coupled via either the TSI 52 and selector 36 to the outgoing port 14" of the path or the TSI 54 and selector 48 to the outgoing port 16" of the path 16. Signals incoming at the port 14' are coupled via either the TSI 30 and the selector 56 to the node's transmit port T or the TSIs 30 and 34 and the selector 36 to the outgoing port 14". Signals incoming at the port 16' are similarly coupled via either the TSI 42 and the selector 56 to the transmit port T or the TSIs 42 and 46 and the selector 48 to the outgoing port 16". For each STS-1 signal channnel, the control processor block 58 maintains in its connection memories appropriate information for routing the signal channel via the node. Thus signal channels are routed through the node via the TSIs and selectors to provide all of the desired signal channel couplings between ports of the node as represented in FIGS. 3and 4.

It will be noted from the above description that STS-1 signals passing through the node between the ports 14' and 14" or between the ports 16' and 16" in each case are conducted via two TSIs, 30 and 34 or 42 and 46. The description in this manner serves to facilitate illustration of the node and an understanding of its operation, and the provision of multiple TSIs and selectors as shown in FIG. 5 facilitates the separation of the components of the node into modular units, such as receiver units, transmitter units, and frame synchronization units, which can be conveniently mounted in and interconnected by communications equipment shelves in nown manner. Alternatively, however, the TSIs and selectors of the node may be rearranged to provide the same functions in a different configuration possibly using fewer TSIs and selectors.

In each node such as that shown in FIG. 5, the control processor block 58 maintains in memory a connection map for each STS-1 signal. In normal operation (FIG. 3) the information in this connection map is used to set up the TSIs and selectors within the node to provide the desired routing of each STS-1 signal. In a fault condition (FIG. 4) protection routing information also in this connection map is used to set up the alternative routing of each STS-1 signal affected by the fault and terminated at the node. For fault detection, in each node the control processor block 58 monitors each STS-1 signal individually, and each STS-1 siganl has its own overhead APS bytes K1 and K2. To this end, the APS bytes are defined for protection purposes for each individual STS-1 signal, although in the current SONET standard these bytes are only used for STS-1 #1, i.e. the first STS-1 siganl multiplexed in a STS-n signal.

Referring again to FIGS. 3 and 4, suppose that in the normal condition of FIG. 3 a siganl channel, i.e. an STS-1 signal connection, exists from a head-end node, for example node 1, to a tail-end node, for example node 3, via the path 14 and an intermediate node, for example node 2, with a corresponding connection in the opposite direction via the path 16 from node 3 to node 1. In each direction and hence on each path, this may for example be channel number 1 of the 48 channels available in the STS-48 signal. In the node 3, the control processor block 58 monitors the line overhead information (e.g. 8-bit interleaved parity information in SONET) for this STS-1 signal because it is terminated at this node, whereby it can detect transmission errors for this signal. Accordingly, in the event of the interruption between nodes 1 and 2 as shown in FIG. 4, the node 3 control processor block is aware of this STS-1 signal being affected.

On detection of the fault, the control processor block 58 in node 3 supplies, on the path 14 on a signal channel (e.g. the 48th STS-1 of the STS-48 signal) which is avaible for a protectin switch, the head-end node number and the faulty channel (in this case node 1, channel 1) in the APS overhead bytes K1 and K2 respectively. In the node 1, these numbers are recognised by it control processor block 58 and a protection switch is made as shown in FIG. 4 to this protection channel, number 48, on the path 16. When the node 3 control processor block 58 recognises the channel 1 traffic in the protection channel number 48, it completes the protection switch to the path 16 at the tail-end. Similar protection switching takes place for the reverse direction of transmission, and where necessary for each other STS-1 signal terminated at each node.

As described above, a node such as the node 3 which is not adjacent a fault, such as the interruption between nodes 1 and 2, must still be able to make a protection switch for connections terminated at this node and affected by the fault. This requirement is avoided in an alternative embodiment of the invention described below with reference to FIGS. 6 and 7.

The system of FIG. 6 is similar to that of FIGS. 3 and 4, except for the provision of loop-back paths within the nodes as described below. FIG. 6 shows six nodes 1 to 6 coupled via oppositely directed paths 14 and 16, and as in FIG. 4 shows an interruption in both paths 14 and 16 between the nodes 1 and 2.

Figure 7:
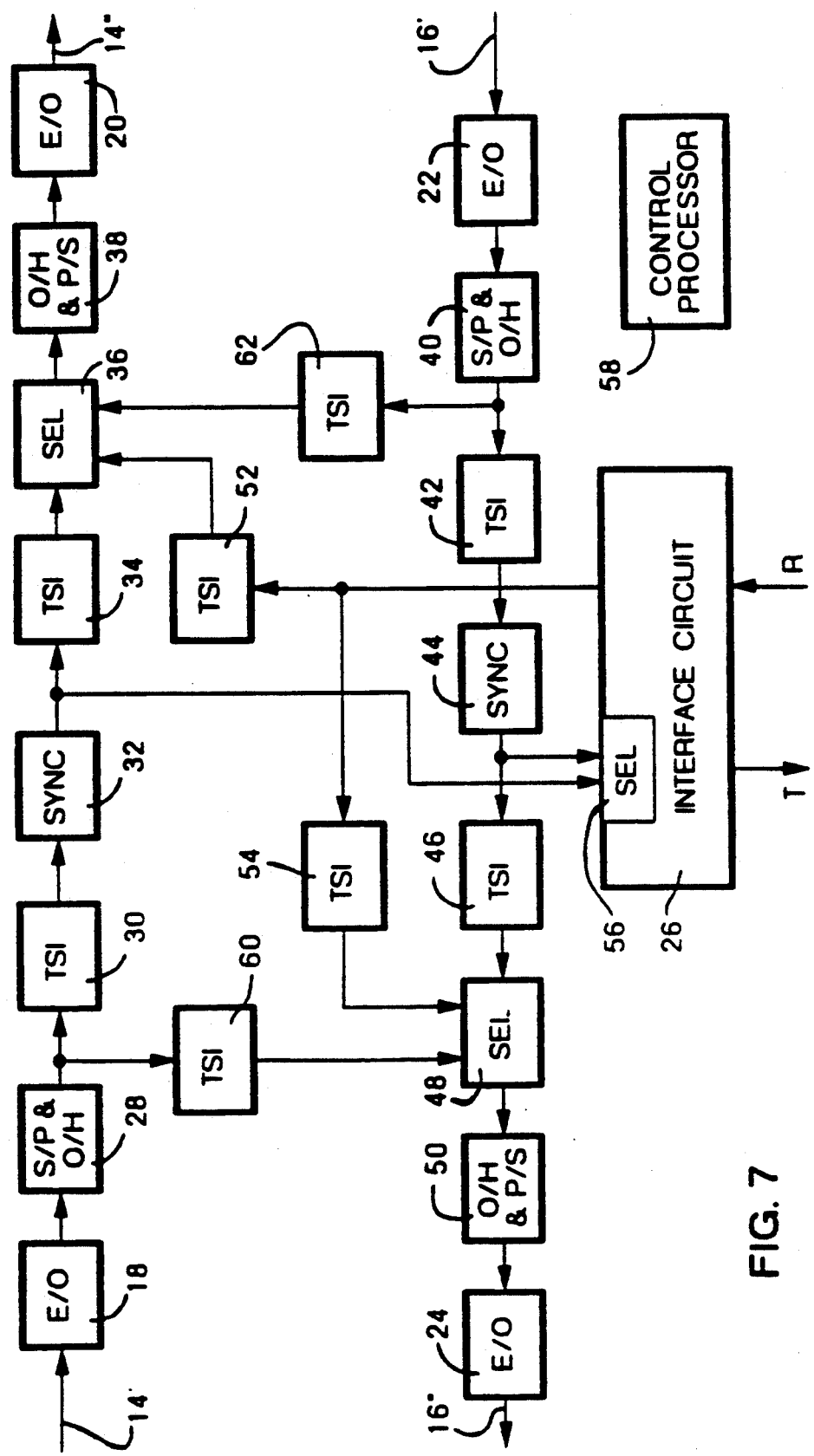
FIG. 7 illustrates a node of the system of FIG. 6.

As shown in FIG. 7, each node of the system of FIG. 6 comprises the same elements as those described above with reference to FIG. 5. In addition, each node includes two further TSIs 60 and 62, having inputs coupled to the output of the S/P & O/Hs 28 and 40 and outputs coupled to third inputs of the selectors 48 and 36 respectively. The TSIs 60 and 62 are controlled by the control processor block 58 in a similar manner to that already described above. Under this control, the TSI 60 provides a loop-back path for STS-1 signals to be selectively conducted from the incoming port 14' to the outgoing port 16", and the TSI 2 provides a loop-back path for STS-1 signals to be selectively conducted from the incoming port 16' to the outgoing port 14". These loop-back paths are shown in FIG. 6 as additional solid lines in the nodes 1 and 2 on each side of the fault, as compared to the lines in these nodes in FIG. 4.

FIG. 6 also shows in dashed lines connection paths for a signal channel connection between nodes 3 and 6 in the fault condition represented. The line with longer dashes shows the path from node 3 port R to node 6 port T, and the line with shorter dashes shows the reverse direction path from node 6 port R to node 3 port T.

It is assumed here that in a normal, non-fault, condition this signal channel connection is from node 3 port R via path 16 and nodes 2 and 1 to node 6 port T, and from node 6 port R via path 14 and nodes 1 and 2 to node 3 port T. Thus this signal channel connection is adversely affected by the fault between nodes 1 and 2. It is further assumed here for purposes of explanation that in the normal condition the signal channel connection is an STS-1 signal occupying channel number 1 in each direction, i.e. channel 1 on the path 16 from node 3 to node 6 and channel 1 on the path 14 from node 6 to node 3, and that channel 48 on each path, and hence in each direction of transmission, is available for a protection switch. It is further assumed for simplicity that there is no time slot interchanging of signals passing through the nodes on the paths 14 and 16.

Now, in response to the fault between nodes 1 and 2, each of these nodes on either side of the fault effects a loop-back connection via the additional TSIs between the channel to be protected and the protection channel. In other words, in the node 1 the control processor block 58 controls the TSI 60 and selector 48 so that channel 1 on incoming port 14' is connected to channel 48 on outgoing port 16", and channel 48 on incoming port 14' is connected to channel 1 on outgoing port 16". Similarly, in the node 2 the control processor block 58 controls the TSI 62 and selector 36 so that channel 1 on incoming port 16' is connected to channel 48 on outgoing port 14", and channel 48 on incoming port 16' is connected to channel 1 on outgoing port 14". No switching is necessary for this signal channel connection in any of the other nodes, whether these are the terminating nodes 3 and 6 or the intermediate nodes 4 and 5.

Thus in the fault condition shown, the connection from node 3 port R to node 6 port T is maintained via path 16 channel 1 to node 2, via the TSI 62 in node 2, via path 14 channel 48 and nodes 3, 4, 5, and 6 in turn to node 1, via the TSI 60 in node 1, and via path 16 channel 1 to node 6. Conversely, the connection from node 6 port R to node 3 port T is maintained via path 14 channel 1 to node 1, via the TSI 60 in node 1, via path 16 channel 48 and nodes 6, 5, 4, and 3 in turn to node 2, via the TSI 62 in node 2, and via path 14 channel 1 to node 3.

Thus in both the normal and the fault conditions, node 3 connects its port R to path 16 channel 1 and its port T to path 14 channel 1, and node 6 connects its port R to path 14 channel 1 and its port T to path 16 channel 1. Hence neither node needs to take any action in response to the fault, because all of the necessary protection switching takes place in the nodes 1 and 2 on each side of the fault. In this manner, the need for communication among the nodes, other than nodes immediately adjacent the fault, for protection switching purposes is eliminated. This advantage is achieved at the cost of the additional TSIs in each node and a greater path length over which the signals are conducted in each direction in the fault condition, but it does not increase the capacity required for protection switching because for each transmission direction only the original channel 1 and the protection channel 48 are used.

The above-described loop-back is effected in each node on either side of a fault only for connections affected by the fault and not terminated at the node. In the system of FIG. 6 a signal channel connection between nodes 1 and 2 would be protected, without any loop-back, in the same manner as in the system of FIGS. 3 and 4, and a signal channel connection between nodes 1 and 3 via node 2 would be protected by loop-backs only in node 2.

As indicated above, in the ring transmission systems of FIGS. 3 to 7 the normal traffic and the protected traffic or spare capacity therefor are time division multiplexed together on each transmission path 14 and 16. Other forms of multiplexing may equally be used.

Figure 8:
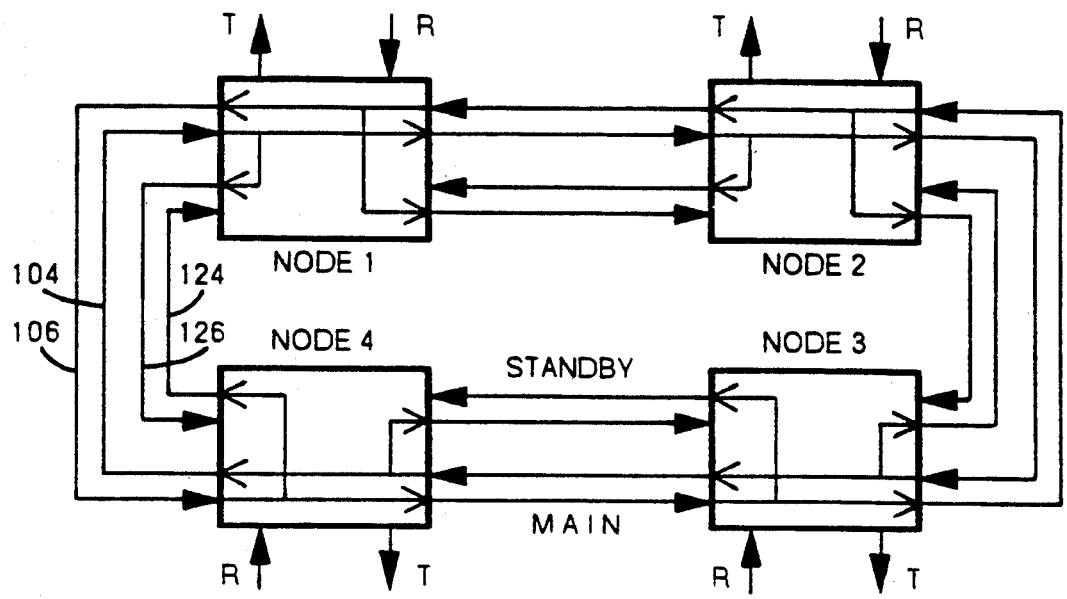
FIGS. 8 and 9 illustrate a ring transmission system in accordance with a further embodiment of this invention in normal and fault conditions respectively.
Figure 9:
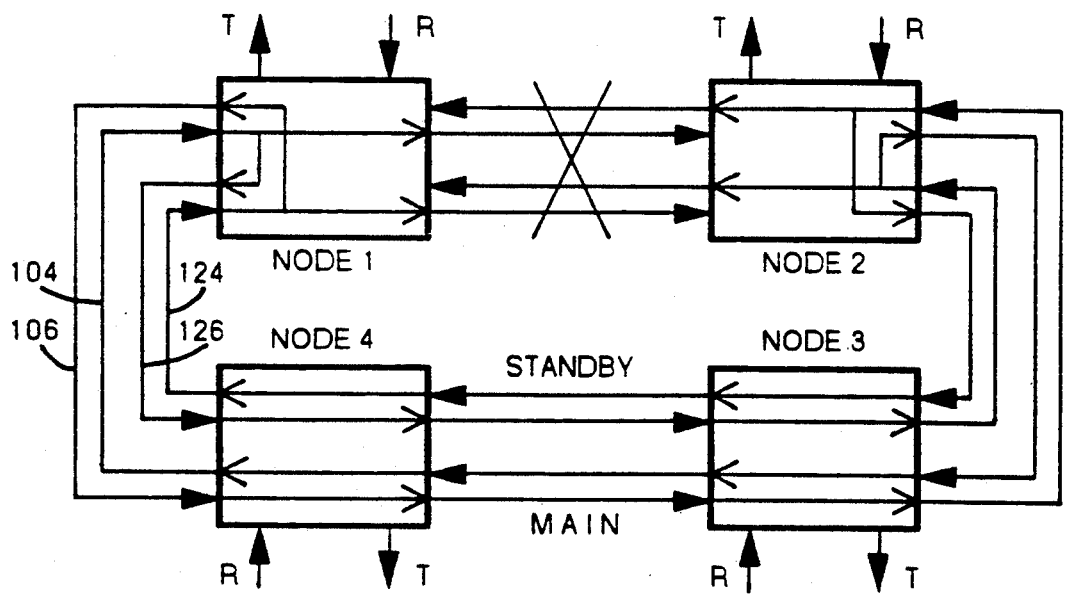

For example, FIGS. 8 and 9 illustrate a ring transmission system in accordance with another embodiment of the invention using space division multiplexing instead of time division multiplexing. FIG. 8 illustrates normal, fault-free, operation, and FIG. 9 illustrates operation in a fault condition similar to that of FIG. 2 and FIG. 4. In the system of FIGS. 8 and 9, as in the systems of FIGS. 3 and 4, there are four nodes and two transmission paths, having clockwise and counterclockwise transmission directions, between adjacent nodes in the ring. The two transmission paths are in this system constituted by four optical fibers, two for each direction of transmission around the ring, one a main path and the other a standby path. THus the paths comprise a clockwise main path 104, a counter-clockwise main path 106, a clockwise standby or protection path 124, and a counter-clockwise standby or protection path 126.

Each node includes a transmit port T and a receive port R, for dropping and inserting signal channels. For clarity and simplicity, in FIGS. 8 and 9 the coupling of signal channels to and from these ports is not illustrated, but it can be similar to that of the previously described embodiments of the invention. Each node can for example have the general form of an intermediate unit, with one working channel and one protection channel for each direction of transmission, as described with reference to FIG. 6 of Reid et al. U.S. Pat. No. 4,646,286 previously referred to, except that in accordance with this invention the nodes are arranged in a ring and the protection switching operation is different accordingly.

In normal, fault-free, operation as shown in FIG. 8, each node operates in conjunction with signals on only the main paths 104 and 06, in substantially the same manner as for the normal traffic carried on the paths 14 and 16 in the system as shown in FIG. 3. The standby paths 124 and 126 are supplied for each node with the same traffic as is supplied to the paths 106 and 104 respectively, and this traffic on these standby paths 124 and 126 incoming to each node is ignored.

For example, for a signal channel connection between the nodes 1 and 2, the signal incoming at the receive port R of node 1 is coupled via the clockwise main path 104 to the transmit port T of the node 2, and the signal incoming at the receive port R of node 2 is coupled via the counter-clockwise main path 1-6 to the transmit port T of node 1. Thus, as in the system of FIG. 3, in the system of FIG. 8 signals between any two nodes are coupled via the most direct route around the loop on both main paths 104 and 105 for the two directions of transmission, each node coupling the signals between its ports to this end.

FIG. 9 illustrates the same system as FIG. 8 but in a fault condition which is equivalent to that of FIGS. 2 and 4, i.e. an interruption of all four paths 104, 106, 124, and 126 between the nodes 1 and 2. In FIG. 9, the nodes 1 and 2 on each side of the fault each switch over to receive signals from the respective standby path instead of from the faulty main path; thus the node 1 switches over to receive signals from the clockwise standby path 124 instead of from the faulty counter-clockwise main path 106, and the node 2 switches over to receive signals from the counter-clockwise standby path 126 instead of from the faulty clockwise main path 104. The other nodes, namely node 3 and node 4, bridge or pass through the standby paths 124 and 126 as shown in FIG. 9, whereby the system is reconfigured as shown in FIG. 9 to maintain two oppositely-directed loops.

Thus the reconfigured system in FIG. 9 also maintains bidirection communications among all of the nodes. For example, for a signal channel connection between the nodes 1 and 2, the signal incoming at the receive port R of node 1 is coupled via the counter-clockwise standby path 126 and the pass-through connections in the nodes 4 and 3 in turn to the transmit port T of node 2, and the signal incoming at the receive port R of node 2 is coupled via the clockwise standby path 124 and the pass-through connections in the nodes 3 and 4 in turn to the transmit port of node 1.

In the system of FIGS. 8 and 9, as in the system of FIGS. 3 and 4, a signal channel connection between, for example, the nodes 3 and 4 is unaffected by the fault between the nodes 1 and 2; in both the normal and the fault condition, signals are coupled from node 3 port R via the main path 104 to node 4 port T, and from node 4 port R via the main path 106 to node 3 port T. Similarly, connections between the adjacent nodes 1 and 4, and between the adjacent nodes 2 and 3, and connections between the nodes 1 and 3 via the node 4, and between the nodes 2 and 4 via the node 3, are unaffected by the fault between the nodes 1 and 2.

In the system of FIGS. 8 and 9, as in the system of FIGS. 3 and 4, a signal channel connection between the nodes 1 and 3 via the node 2 is affected by the fault between the nodes 1 and 2. In this case, the signal incoming at node 3 port R and previously coupled via the main path 106 and node 2 to node 1 port T, is in FIG. 9 instead coupled via the standby path 124 and node 4. Conversely, the signal supplied to node 3 port T, originating at node 1 port R and previously derived via node 2 and the main path 104, is in FIG. 9 derived via node 4 and the standby path 126.

Thus the system of FIG. 8 and 9 is directly analogous to that of FIGS. 3 and 4, the only substantial difference being that in the system of FIGS. 3 and 4 the normal and protection channels are time division multiplexed on the same fiber 14 or 16 for each transmission direction, whereas in the system of FIGS. 8 and 9 the normal and protection channels are space division multiplexed on two distinct fibers, 104 and 124 or 106 and 126, for each transmission direction. The same capacity advantages thus also apply to the system of FIGS. 8 and 9 as for the system of FIGs. 3 and 4.

Figure 10:
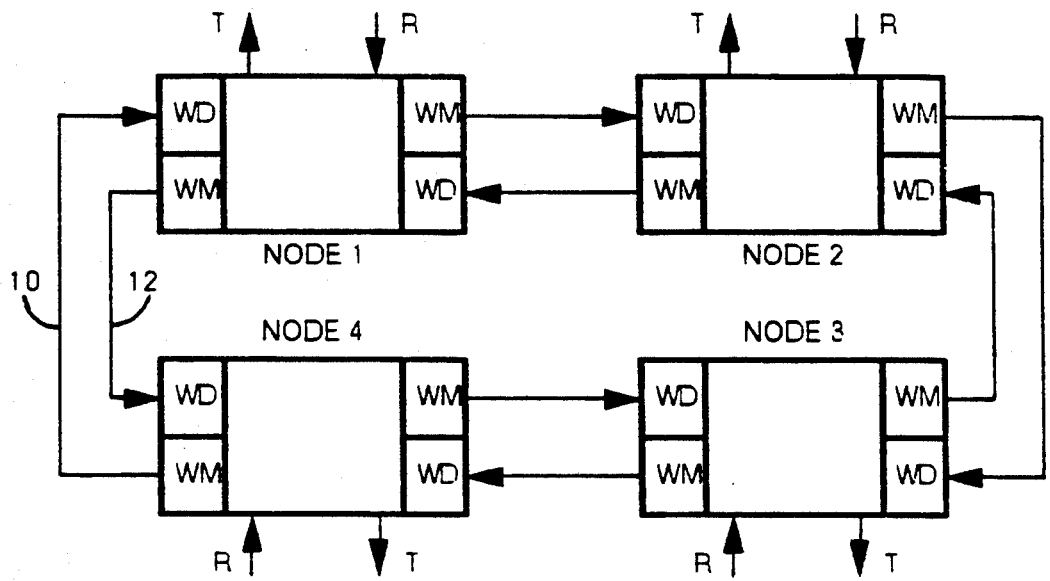
FIG. 10 illustrates a ring transmission system in accordance with yet another embodiment of this invention.

The same advantages also apply to other multiplexing arrangements, for example that of FIG. 10. In the system of FIG. 10, which operates in the same manner as the system of FIGS. 8 and 9, the main path 104 and standby path 124 are wavelength division multiplexed onto a single fiber 10 which is accordingly terminated at its ends by a wavelength multiplexer WM and a wavelength demultiplexer WD. The main path 106 and standby path 126 are similarly wavelength division multiplexed onto a single fiber 12 for the opposite transmission direction. Obviously, the fibers 10 and 12 could be replaced by a single fiber supporting both directions of transmission or traffic in opposite directions of transmission could be multiplexed on respective fibers for the main and standby paths.

Thus the invention encompasses within its scope arbitrary multiplexing arrangements, and the invention is applicable to systems using time division multiplexing of the normal and protection channels on a single optical fiber (or other transmission medium) such as the fibers 14 and 16 in FIGS. 3 to 7, using space division multiplexing of the normal and protection channels on a pair of optical fibers such as the fibers 104, 124, and 106, 126 in FIGS. 8 and 9, or using wavelength division multiplexing of the normal and protection channels on a fiber such as the fibers 10 and 2 in FIG. 10. Equally, frequency division multiplexing may be used, and combinations and modifications of all such multiplexing arrangements may be used. What is fundamental to the invention is that there be two multiplexed oppositely directed transmission paths around the ring each of which, in whatever way it is multiplexed, is capable of accommodating both normal traffic and protection-switched traffic.

It should be appreciated that in all of the embodiments of the invention described above the traffic capacity which is provided for protection purposes can, if desired, be used in normal, fault-free operation of the system for accommodating extra traffic of relatively low priority, which extra traffic is partly or totally pre-empted in the event of a fault against which protection is required.

Figure 11:
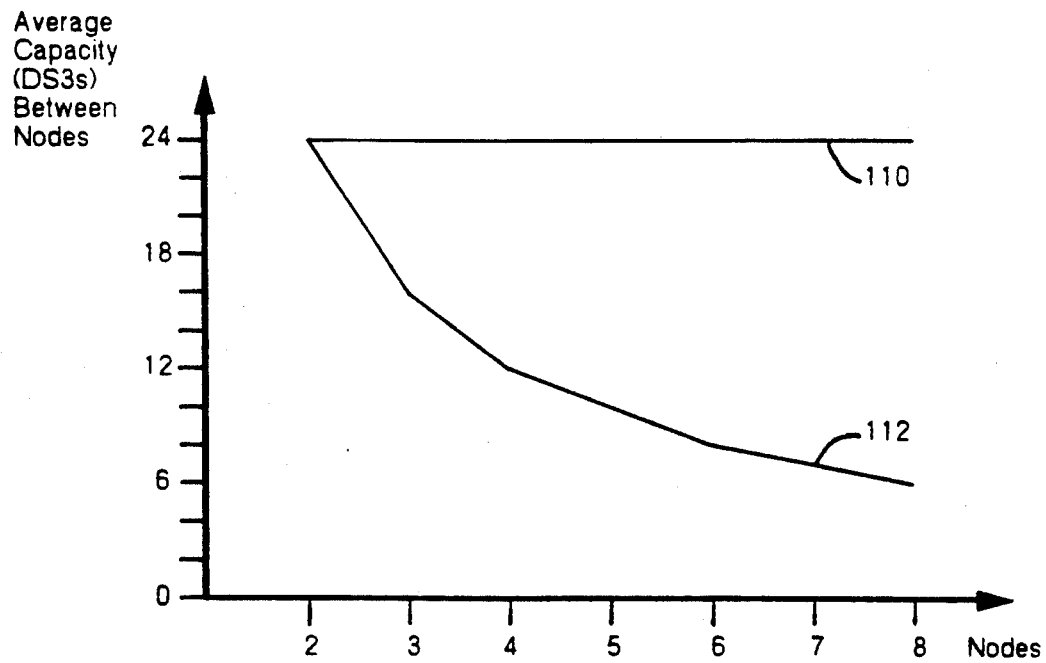
FIG. 11 is an explanatory graph.

FIG. 11 illustrates graphically the traffic capacity advantages which are provided by systems in accordance with this invention, assuming by way of example that the total traffic capacity in each transmission direction (i.e. clockwise or counter-clockwise) is equivalent to 48 DS-3 channels. In other words, for the illustration of FIG. 11 it is assumed that 48 DS-3 channels can be accommodated by the fiber 10 of FIG. 1 or FIG. 10, the fiber 14 of FIG. 3 or FIG. 6, or the fibers 104 and 124, combined, of FIG. 8. This figure of 48 is arbitrarily selected to correspond to the OC-48 optical signal capacity of the fibers 14 and 16 as described above.

Based on this assumption, FIG. 11 shows by a line 110 for systems in accordance with this invention and as described with reference to FIGS. 3 to 10, and by a line 112 for the prior art of FIGS. 1 and 2, the average capacity in DS-3 channels between adjacent nodes as a function of the number of nodes in the system.

As should be apparent from the description of traffic capacities above with reference to FIGS. 3 and 4, in a system in accordance with the invention the average capacity between nodes is independent of the number of nodes in the system, because each path between two adjacent nodes is only required to accommodate its normal traffic between these nodes plus the greatest level of traffic between any other two adjacent nodes in the system. Thus for the 48 DS-3 channel capacity of FIG. 11, the line 110 is constant at 24 DS-3 channels capacity for normal traffic, the other 24 DS-3 channels being available for protection.

In contrast, in the prior art system of FIGS. 1 and 2 each path must be capable of carrying the total traffic capacity around the loop; on average, this is equal to the 48 DS-3 channel capacity of the path 10 (or 12) divided by the number of node sin the system, resulting in the falling line 112 in FIG. 11. The traffic capacity advantages of this invention thus become increasingly more important as the number of nodes increases, as evidenced by the increasing separation between the lines 110 and 112 in FIG. 11.

The description above relates for simplicity and clarity to ring transmission systems each with only one ring or double loop. Transmission systems, for example telecommunications networks, are generally more complex than this and desirably may have many adjacent and overlapping bidirectional loops. The invention is equally applicable to the loops of such more complex networks.

Figure 12:
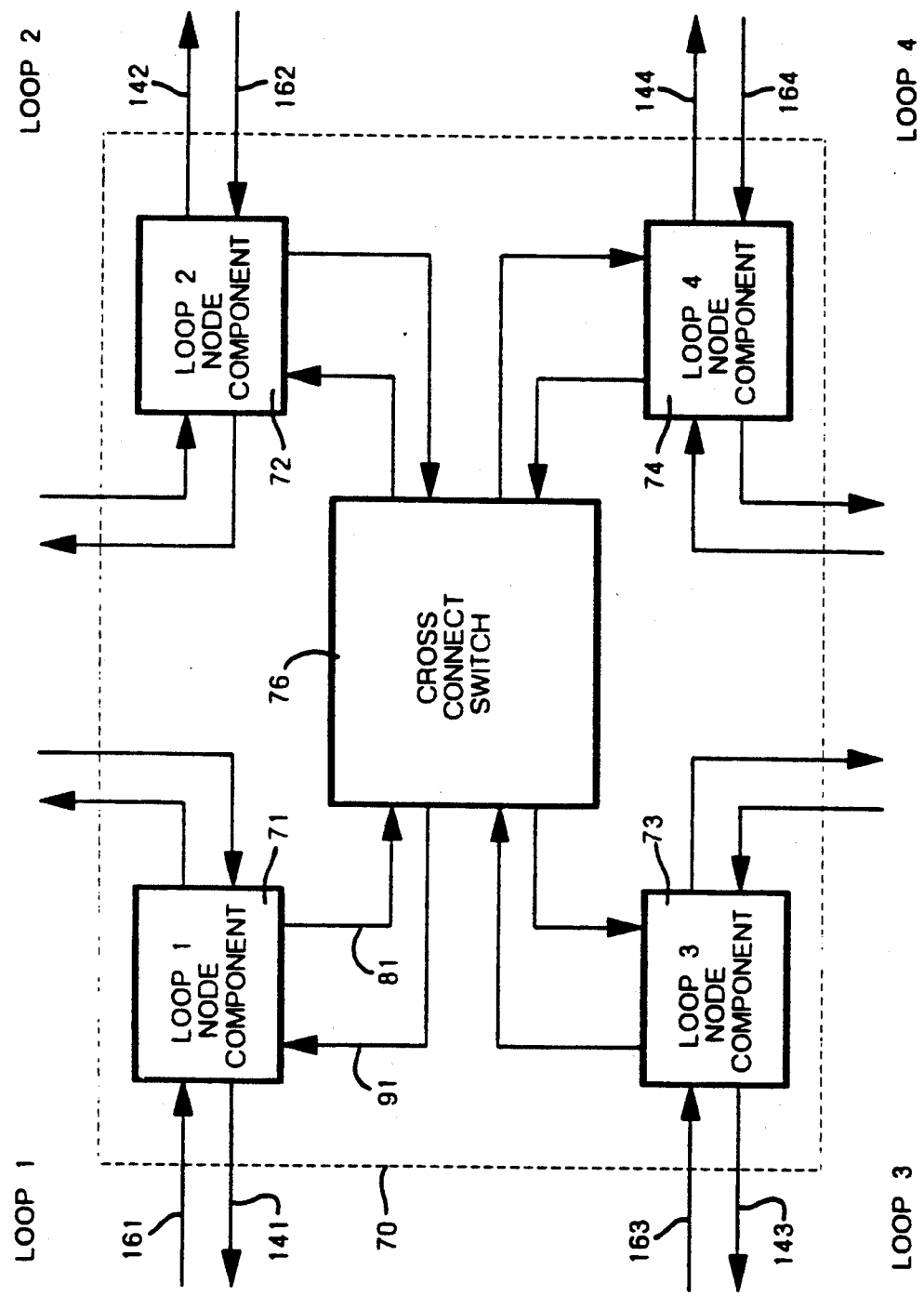
FIG. 12 illustrates a cross connect node in a network of intersecting loops.

For example, FIG. 12 illustrates one node 70 of a communications network, which node is at an intersection point of four looped transmission systems each as described above with reference to FIGS. 3 to 7. Thus in FIG. 12 transmission paths 141 and 161 correspond to the paths 14 and 16 respectively of a first looped transmission system, LOOP 1, as described above. Similarly, paths 142 and 162, 143 and 163, and 144 and 164 correspond to the paths 14 and 16 respectively of other looped transmission systems LOOP 2, LOOP 3, and LOOP 4. Although four loops are referred to here, there may be an arbitrary number of intersecting loops. The loops themselves may be adjacent one another, overlapping, or within one another as desired for the particular network.

The network node 70 includes four node components 71 to 74, each connected in a respective one of the looped transmission systems LOOP 1 to LOOP 4, each of which corresponds substantially to a node as described above with reference to FIG. 5 or FIG. 7. The ports T and R of each node component are coupled via paths, e.g. 81 and 91 for the node component 71, to respective ports of a cross connect switch 76 of the node 70. The cross connect switch 76 serves in known manner to switch signals among its ports. Accordingly, signal channels in different loops, for example LOOP 1 and LOOP 3, can be coupled via the cross connect switch 76 to provide communications throughout the network.

Obviously, within the network node 70 parts of the individual node components 71 to 74 and of the cross connect switch 76 may be merged with one another and in some cases (e.g. the interface circuit 26) simplified or dispensed with, whereby the network node as a whole may be provided more conveniently and economically than the individual components thereof illustrated separately for simplicity and clarity.

Similarly, a communications network may be provided using ring transmission systems as described above with reference to FIGS. 8 and 9, or FIG. 10.

Although particular embodiments of the invention have been described in detail, it should be appreciated that numerous modifications, variations, and adaptations maybe made thereto without departing from the scope of the invention as defined in the claims.

What is claimed is:

1. A communications network comprising a plurality of transmission systems each transmission system comprising a plurality of nodes coupled in a ring via first and second multiplexed transmission paths providing for transmission in opposite directions around the ring, the nodes comprising means for providing, in normal operation, communications from a first node to a second node via the first path and from the second node to the first node via the second path, and for providing, in the presence of a fault affecting said communications in normal operation, as recognized only by nodes immediately adjacent the fault, communications from the first node to the second node via the second path and from the second node to the first node via the first path, whereby bidirectional communications between the first and second nodes are provided in normal operation via both paths on a first part of the ring between the nodes and in the presence of a fault, via both paths on a second, different part of the ring between the nodes; wherein there is a third node coupled in the first part of the ring between the first node and the fault, and the means for providing communications in the presence of the fault comprises means for providing communications:
   from the first node to the second node via the first path between the first and third nodes, via the third node between the first and second paths, and via the second path between the third and second nodes; and
   from the second node to the first node via the first path between the second and third nodes, via the third node between the first and second paths, and via the second path between the third and first nodes;
   the third node providing communications between the first and second paths in response to the fault, the other nodes of the plurality of nodes providing communications as in the normal operation;
   the plurality of transmission systems intersecting at least one network node, the network node comprising a node of each transmission system and switching means for providing communications between the transmission systems.

2. A transmission system comprising a plurality of nodes coupled in a ring via first and second multiplexed transmission paths providing for transmission in opposite directions around the ring, the nodes comprising means for providing, in normal operation, communications from a first node to a second node via the first path and from the second node to the first node via the second path, and for providing, in the presence of a fault, affecting said communications in normal operation, communications from the first node to the second node via the second path and from the second node to the first node via the first path, whereby bidirectional communications between the first and second nodes are provided in normal operation via both paths on a first part of the ring between the nodes and in the presence of a fault, as recognized only by the nodes immediately adjacent the fault, via both paths on a second, different part of the ring between the nodes; wherein there is a third node coupled in the first part of the ring between the first node and the fault, and the means for providing communications in the presence of the fault comprises means for providing communications:
   from the first node to the second node via the first path between the first and third nodes, via the third node between the first and second paths, and via the second path between the third and second nodes; and
   from the second node to the first node via the first path between the second and third nodes, via the third node between the first and second paths, and via the second path between the third and first nodes;
   the third node providing communications between the first and second paths in response to the fault, the other nodes of the plurality of nodes providing communications as in the normal operation.

3. A system as claimed in claim 2 wherein said multiplexed transmission paths comprise time division multiplexed paths.

4. A system as claimed in claim 2 wherein said multiplexed transmission paths comprise wavelength division multiplexed paths.

5. A transmission system comprising a plurality of nodes coupled in a ring via first and second multiplexed transmission paths providing for transmission in opposite directions around the ring, the nodes comprising means for providing, in normal operation, communications from a first node to a second node via the first path and from the second node to the first node via the second path, and for providing, in the presence of a fault, affecting said communications in normal operation, communications from the first node to the second node via the second path and from the second node to the first node via the first path, whereby bidirectional communications between the first and second nodes are provided in normal operation via both paths on a first part of the ring between the nodes and in the presence of the fault, as recognized only by the nodes immediately adjacent the fault, via both paths on a second, different, part of the ring between the nodes; wherein a third node is coupled in the first part of the ring between the first node and the fault and a fourth node is coupled in the first part of the ring between the second node and the fault, and the means for providing communications in the presence of the fault comprises means for providing communications:
   from the first node to the second node via the first path between the first and third nodes, via the third node between the first and second paths, via the second path between the third and fourth nodes, via the fourth node between the second and first paths, and via the first path between the fourth and second nodes; and
   from the second node to the first node via the second path between the second and fourth nodes, via the fourth node between the second and first paths, via the first path between the fourth and third nodes, via the third node between the first and second paths, and via the second path between the third and first nodes;

the third and fourth nodes providing communications between the first and second paths in response to the fault therebetween, the other nodes of the plurality of nodes providing communications as in the normal operation.

6. A system as claimed in claim 5 wherein said multiplexed transmission paths comprise time division multiplexed paths.

7. A system as claimed in claim 5 wherein said multiplexed transmission paths comprise wavelength division multiplexed paths.

8. A communication network comprising a plurality of transmission systems each transmission system comprising a plurality of nodes coupled in a ring via first and second multiplexed transmission paths providing for transmission in opposite directions around the ring, the nodes comprising means for providing, in normal operation, communications from a first node to a second node via the first path and from the second node to the first node via the second path, and for providing, in the presence of a fault affecting said communications in normal operation, communications from the first node to the second node via the second path and from the second node to the first node via the first path, whereby bidirectional communications between the first and second nodes are provided in normal operation via both paths on a first part of the ring between the odes and in the presence of the fault, via both paths on a second, different, part of the ring between the nodes; wherein a fault is recognized only by nodes immediately adjacent the fault; wherein a third node is coupled in the first part of the ring between the first node and the fault and a fourth node is coupled in the first part of the ring between the second node and the fault, and the means for providing communications in the presence of the fault comprises means for providing communications:

from the first node to the second node via the first path between the first and third nodes, via the third node between the first and second paths, via the second path between the third and fourth nodes, via the fourth node between the second and first paths, and via the first path between the fourth and second nodes; and from the second node to the first node via the second path between the second and fourth nodes, via the fourth node between the second and first paths, via the first path between the fourth and third nodes, via the third node between the first and second paths, and via the second path between the third and first nodes;

the third and fourth nodes providing communications between the first and second paths in response to the fault therebetween, the other nodes of the plurality of nodes providing communications as in the normal operation;

the plurality of transmission system intersecting at least one network node, the network node comprising a node of each transmission system and switching means for providing communications between the transmission systems.

9. A method of transmitting signals in a transmission system comprising at least four nodes coupled in a ring via first and second multiplexed transmission paths providing for transmission in opposite directions around the ring, comprising the steps of:

in normal operation, transmitting signals from a first node to a second node via the first transmission path and a third node between the first and second nodes, and transmitting signals from the second node to the first node via the second transmission path and the third node; and in the presence of a fault between the second and third nodes, recognizing the fault only at the second and third nodes immediately adjacent the fault, the second and third nodes immediately adjacent the fault routing signals between the first and second transmission paths, the other nodes of the at least four nodes transmitting signals as in the normal operation; transmitting signals from the first node to the second node via the first transmission path between the first and third nodes, via the third node between the first and second transmission paths, and via the second transmission path and at least a fourth node between the third and second nodes, and transmitting signals from the second node to the first node via the first transmission path and the at least fourth node between the second and third nodes, via the third node between the first and second transmission paths, and via the second transmission path between the third and first nodes.

10. A method as claimed in claim 9 wherein said multiplexed transmission paths comprise time division multiplexed paths.

11. A method as claimed in claim 9 wherein said multiplexed transmission paths comprise wavelength division multiplexed paths.

* * * * *